United States Patent
Kondo et al.

(10) Patent No.: US 7,031,384 B2
(45) Date of Patent: *Apr. 18, 2006

(54) APPARATUS FOR GENERATING MOTION CONTROL SIGNAL FROM IMAGE SIGNAL

(75) Inventors: Tetsujiro Kondo, Tokyo (JP); Yuji Okumura, Kanagawa (JP); Tetsushi Kokubo, Chiba (JP); Satoshi Teshigawara, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 162 days.

(21) Appl. No.: 09/488,286

(22) Filed: Jan. 20, 2000

(65) Prior Publication Data

US 2003/0095601 A1 May 22, 2003

(30) Foreign Application Priority Data

Jan. 22, 1999 (JP) ............................................. 11-013883

(51) Int. Cl.
*H04B 1/66* (2006.01)

(52) U.S. Cl. ..................... 375/240.01; 434/62; 348/352
(58) Field of Classification Search ............ 434/55–62, 434/69, 70, 236; 375/240.01, 240.15, 240.16; 472/60; 463/30
See application file for complete search history.

(56) References Cited

U.S. PATENT DOCUMENTS

| 5,022,708 | A | | 6/1991 | Nordella et al. | |
|---|---|---|---|---|---|
| 5,364,270 | A | * | 11/1994 | Aoyama et al. | 434/55 |
| 5,486,141 | A | | 1/1996 | Ohga et al. | 472/60 |
| 5,499,920 | A | | 3/1996 | Trumbull | |
| 5,662,523 | A | * | 9/1997 | Yasumary et al. | 463/30 |
| 5,686,690 | A | * | 11/1997 | Lougheed et al. | 434/55 |
| 5,807,114 | A | * | 9/1998 | Hodges et al. | 343/236 |
| 5,987,152 | A | | 11/1999 | Weisser | 382/104 |
| 5,987,174 | A | | 11/1999 | Nakamura et al. | 382/199 |
| 6,007,338 | A | * | 12/1999 | DiNunzio et al. | 434/55 |
| 6,113,500 | A | * | 9/2000 | Pranceis et al. | 472/60 |
| 6,224,380 | B1 | * | 5/2001 | Lo et al. | 434/69 |
| 6,236,412 | B1 | * | 5/2001 | Ojima | 345/474 |
| 6,336,811 | B1 | * | 1/2002 | Shiina et al. | 434/55 |

FOREIGN PATENT DOCUMENTS

| JP | 07-182533 | 7/1995 |
|---|---|---|
| JP | 11-153949 | 6/1999 |

* cited by examiner

*Primary Examiner*—Tung Vo
(74) *Attorney, Agent, or Firm*—Frommer Lawrence & Haug LLP; William S. Frommer; Darren M. Simon

(57) ABSTRACT

In order to easily generate a control signal when a motion in accordance with an image is applied to a chair for an observer, a motion vector is detected from an image signal input to an image processing apparatus by a feature information detection section. By using the motion vector, a horizontal component, a vertical component, a magnification component, and a rotation component are determined. A feature information processing section generates a control signal to be supplied to a driving section from these determined components.

6 Claims, 6 Drawing Sheets

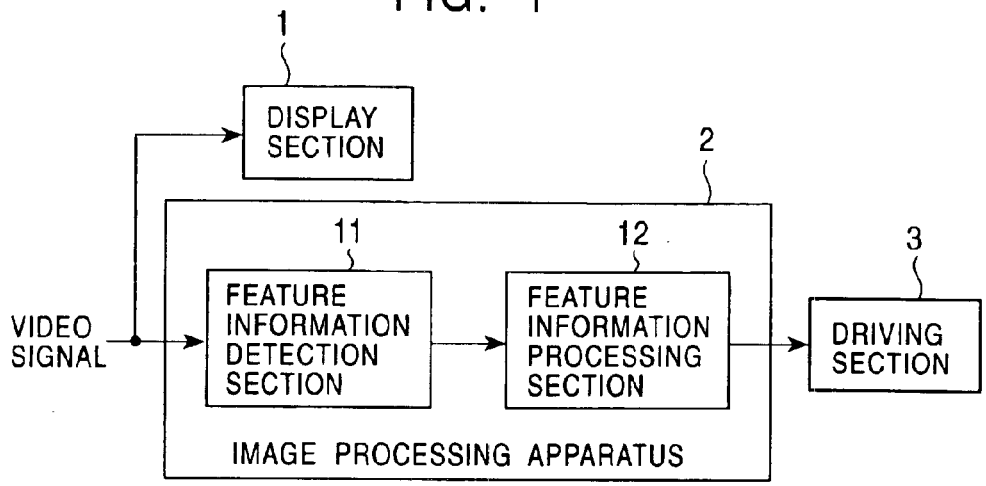
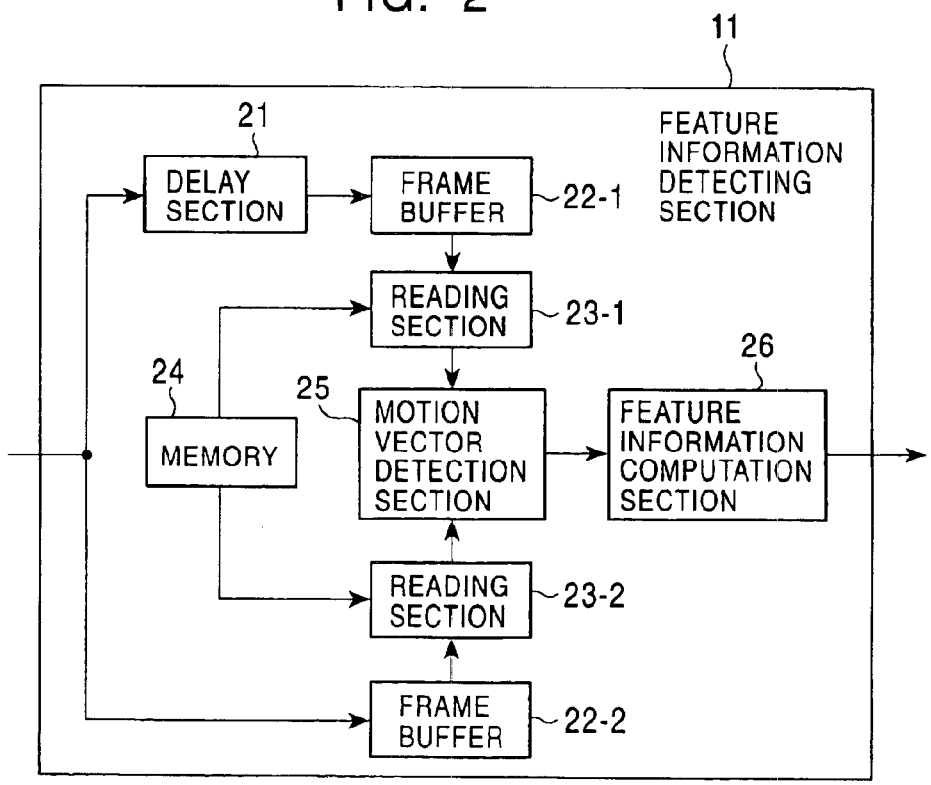

FRAME

PORTION TO BE REMOVED

APPARATUS FOR GENERATING MOTION CONTROL SIGNAL FROM IMAGE SIGNAL

BACKGROUND OF THE INVENTION

1. Field of the Invention

The present invention relates to image processing.

2. Description of the Related Art

An apparatus in which, when an observer is viewing an image, verisimilitude is improved by controlling, in accordance with the image, the motion of a chair on which the observer is sitting, is known. A motion control signal, which is supplied to such an apparatus to cause a chair to move, is generated from data obtained by a sensor for detecting an angle at the same time when an image is captured, or a motion control signal is generated through a manual operation by observing the captured image by a person and by predicting motion by that person.

In the above-described apparatus, when a motion control signal for a chair is generated by a sensor, data for generating the motion control signal must be recorded at the same time the image is captured. Therefore, it is not possible to generate a motion control signal by using an image which has already been captured. Also, when a person observes a captured image and a motion control signal is generated, a manual operation is required, presenting a problem in that processing takes a long time.

SUMMARY OF THE INVENTION

The present invention has been achieved in view of such circumstances. An object of the present invention is to provide an information processing apparatus which generates a motion control signal from an input image.

To achieve the above-mentioned object, according to a first aspect of the present invention, there is provided an information processing apparatus comprising: a motion detector for detecting a motion-related signal, which is information relating to motion, in accordance with an image signal; and a generator for generating a motion control signal in accordance with the motion-related signal.

According to a second aspect of the present invention, there is provided an information processing method comprising the steps of: detecting a motion-related signal, which is information relating to motion, in accordance with an image signal; and generating a motion control signal in accordance with the motion-related signal.

According to a third aspect of the present invention, there is provided a storage medium storing a computer-controllable program, the program comprising the steps of: detecting a motion-related signal, which is information relating to motion, in accordance with an image signal; and generating a motion control signal in accordance with the motion-related signal.

The above and further objects, aspects and novel features of the invention will become more apparent from the following detailed description when read in connection with the accompanying drawings.

BRIEF DESCRIPTION OF THE DRAWINGS

FIG. 1 is a block diagram showing the construction of an embodiment of an image processing apparatus of the present invention.

FIG. 2 is a block diagram showing the construction of a feature information detection section 11 of FIG. 1.

DESCRIPTION OF THE PREFERRED EMBODIMENT

Figure 3:
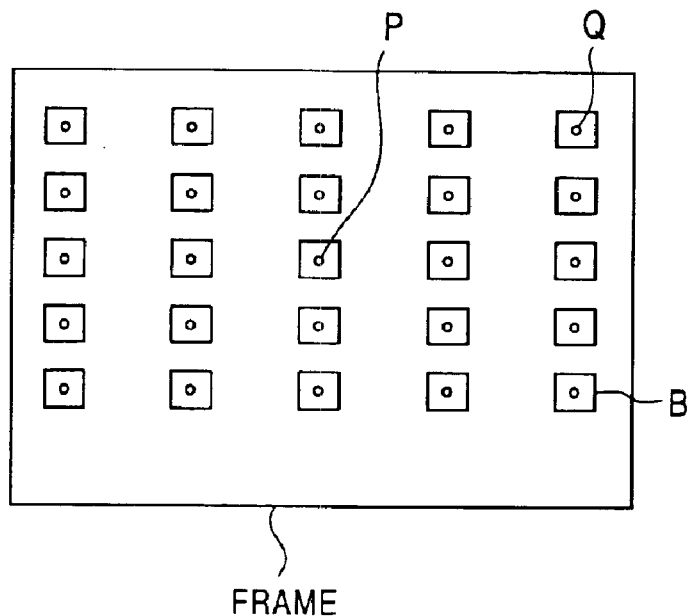
FIG. 3 shows a pattern stored in a memory 24 of FIG. 2.

FIG. 1 is a block diagram showing the construction of an embodiment of an image processing apparatus of the present invention. An image signal supplied from an image tape recorder (not shown), etc., is supplied to a display section 1 and an image processing apparatus 2. The image processing apparatus 2 generates a motion control signal for driving a driving section 3.

The image processing apparatus 2 comprises a feature information detection section 11 and a feature information processing section 12. A signal input to the image processing apparatus 2 is input to the feature information detection section 11 whereby feature information (to be described later) is detected and is output to the feature information processing section 12. The feature information processing section 12 computes a motion control signal to be supplied to the driving section 3 from the input feature information. The driving section 3 drives (motion controls) a chair on which an observer who observes an image sits in accordance with the input motion control signal. This point will be described later.

FIG. 2 is a block diagram showing the construction of the feature information detection section 11. The image signal input to the feature information detection section 11 is delayed by an amount corresponding to one frame by a delay section 21, after which it is supplied to a frame buffer 22-1 and is also supplied to a frame buffer 22-2. Reading sections 23-1 and 23-2 read an image signal from the corresponding frame buffers 22-1 and 22-2 in accordance with a predetermined pattern stored in a memory 24, and output the image signal to a motion vector detection section 25.

The motion vector detection section 25 detects a motion vector from the supplied image signal and outputs the motion vector to a feature information computation section 26. The feature information computation section 26 computes feature information from the input motion vector.

Next, the operation of the feature information detection section 11 shown in FIG. 2 is described. At time t, the image signal input to the feature information detection section 11 is supplied to the delay section 21 and the frame buffer 22-2. The frame buffer 22-2 stores input image signals for one frame. Since the delay section 21 delays the image signal by an amount corresponding to one frame, at time t, an image signal at time t-1 earlier than time t, that is, an image signal one frame before that at time t, is stored in the frame buffer 22-1. The image signal at time t-1, stored in the frame 22-1, is read by the reading section 23-1, and the image signal at time t, stored in the frame buffer 22-2, is read by the reading section 23-2.

The reading sections 23-1 and 23-2 read an image signal in a portion corresponding to the pattern stored in the memory 24 from among the image signals stored in the corresponding frame buffers 22-1 and 22-2. Here, a pattern stored in the memory 24 is described with reference to FIG. 3.

Figure 4:
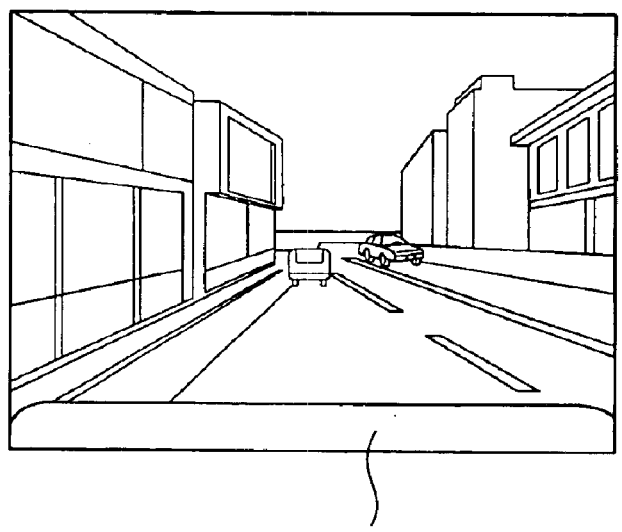
FIG. 4 shows an image to be processed.

FIG. 3 shows an example of a pattern stored in the memory 24. In the case of those portions of the pixels forming one frame, which are not related to motion, for example, image signals captured by a video camera mounted to an automobile, such as that shown in FIG. 4, the hood portion of the automobile is considered to be an area which is not related to motion control, and accordingly, the pixel positioned at the center of the area from which that area has been removed is denoted as a convergence point P. For example, 25 representative points Q (including the convergence point) at positions symmetrical horizontally and vertically about the convergence point P are set. For each representative point Q, a reference block B, composed of a predetermined number of pixels, with the representative point Q being positioned at the center, for example, a reference block B composed of 33×33 pixels, is set. In the memory 24, the coordinates of each representative point Q within the image plane of such a frame, the size of the reference block B, and the size of a retrieval block (not shown) composed of, for example, 65×65 pixels, are stored as a pattern.

The reading section 23-1 reads pixel data corresponding to the above-mentioned pattern stored in the memory 24, that is, pixel data within each reference block B, in accordance with the coordinates of the representative point Q and the size of the reference block B from among the image signals at time t-1 stored in the frame buffer 22-1, and outputs the pixel data, as the data of the reference block, to the motion vector detection section 25. In a similar manner, the reading section 23-2 reads pixel data corresponding to the pattern stored in the memory 24 from among the image signals at time t stored in the frame buffer 22-2, and outputs the pixel data, as the data of the retrieval block, to the motion vector detection section 25.

The motion vector detection section 25 detects the motion vector at each representative point Q by performing block matching by using the input data of the reference block and the input data of the retrieval block. Therefore, in the case of this example, 25 motion vectors are detected.

In this embodiment, there is no need to detect a motion vector with respect to all the pixels because the aim is to generate a motion control signal. Therefore, only 25 motion vectors are determined. This makes it possible to reduce the scale of the circuit and to increase the processing speed.

The feature information computation section 26 computes, based on the equations shown below, a total of four components of a horizontal component u, a vertical component v, a magnification component $v_{zoom}$, and a rotation component $v_{rot}$ of the motion as the entirety of the frame at time t by using the 25 motion vectors detected by the motion vector detection section 25.

| | | |
|---|---|---|
| Horizontal component u | = (1/n) Σu$_1$ | (1) |
| Vertical component v | = (1/n) Σv$_1$ | (2) |
| Magnification component $v_{zoom}$ | = (1/n) Σ$v_{zoomi}$/d$_1$ | (3) |
| Rotation component $v_{rot}$ | = (1/n) Σ$v_{roti}$/d$_1$ | (4) | where the subscript i indicates the number affixed to the representative point $Q_i$, which varies from 1 to 25 in this example, and n indicates the number of representative points, which is 25 in this example. The values obtained by equations (1) to (4) are the average value of each component u, $v_{zoom}$, and $v_{rot}$ obtained by the motion vector detection section 25.

Figure 5:
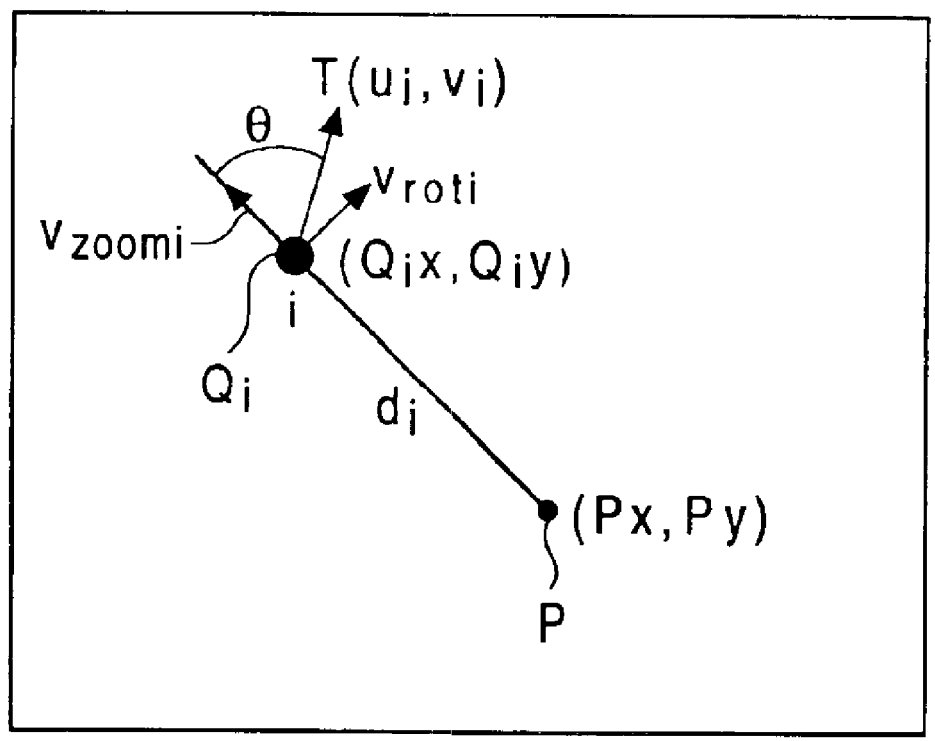
FIG. 5 is an illustration of a vector to be computed.

The relationship among the above-mentioned components u, v, $v_{zoom}$, and $v_{rot}$ is described with reference to FIG. 5. The horizontal component of a motion vector T of a representative point $Q_i$ for the object of processing is denoted as $u_i$, and the vertical component is denoted as $v_i$. $d_i$ is a scalar quantity indicating the distance from the convergence point P to the representative point $Q_i$. (Px, Py) indicates the coordinates of the convergence point P, and the distance up to the representative point $Q_i$, of the coordinates ($Q_i$x, $Q_i$y) is computed with these coordinate values as a reference.

The component ($u_i$, $v_i$) of this motion vector T is a component when the representative point $Q_i$ is assumed to be the origin. The component in a direction parallel to the straight line which connects the convergence point P to the representative point $Q_i$, of the motion vector T is denoted as $v_{zoomi}$, and the component in a direction perpendicular to the straight line which connects the convergence point P to the representative point $Q_i$ is denoted as $v_{roti}$. Also, the angle formed between the straight line which connects the convergence point P to the representative points $Q_i$ and the motion vector T is denoted as θ. At this time, $v_{zoomi}$ and $v_{roti}$ are determined based on the following equations.

$$v_{zoomi} = (u_i^2 + v_i^2)^{(1/2)} \cos θ \quad (5)$$

$$v_{roti} = (u_i^2 + v_i^2)^{(1/2)} \sin θ \quad (6)$$

Here, although the values of 25 motion vectors are used in an averaged manner in order to determine each component, each component may be weighted based on the positional relationship on the image plane.

The feature information computation section 26 computes four component data u, v, $v_{zoom}$, and $v_{rot}$, as feature information, by using equations (1) to (4) from the motion vector output from the motion vector detection section 25. The computed four component data u, v, $v_{zoom}$, and $v_{rot}$ are output to the feature information processing section 12 (FIG. 1).

Here, for example, when an observer is made to virtually experience the feeling of riding in an automobile, the types of forces (motions) which should be applied to the chair on which the observer is sitting are considered. Examples of forces applied to the chair of the automobile include a force for representing the forward-rearward inclination of the surface of the road when the automobile is running on a sloping road, such as, a grade, a force for representing vibrations in the up-and-down direction which are received from the surface of the road when the automobile is running on a bumpy road, and a force for representing the inclination in the left-right direction of the surface of the road when the automobile is running on a sloping road.

These forces are forces capable of providing a stimulus in a form in which the physical sensation is the same, to the chair of the observer who observes the image, from among the stimuli given to the automobile to which a video camera capturing the image is mounted, and are called "actual stimuli" herein. The actual stimulus is such that when the value thereof is integrated, the value becomes zero.

In contrast, a force for representing the centrifugal force when the automobile is turning on a curve, a force for representing the inertial force during acceleration and deceleration, and a force for representing the yawing of the automobile in a curve are such that the value thereof does not become zero even if the value is integrated. These are stimuli in which it is difficult to give in a form in which the physical sensation is the same as the stimuli which are given to the automobile due to limitations in the distance the chair can be moved, limitations in the movement direction, etc., and are called "simulated stimuli" herein.

The relationship among the force concerning the above-mentioned actual stimulus and the simulated stimulus, the component of the motion control signal which is actually applied to the chair for the observer, and the four components computed by the feature information computation section 26 is shown below. The motion control signal for the forward-rearward inclination of the surface of the road among the actual stimuli shown below is one of the motion control signal components "pitch" and can be represented by an amount of the low frequencies from among the components in the vertical direction of the motion vector. Here, since the inclination of the surface of the road is considered to vary in slow cycles, low-frequency components are used. The vibration received from the surface of the road is considered to be given in a vertical direction and is also considered to be at a high frequency. Therefore, for the motion control signal for the vibration received from the surface of the road, high-frequency components among the components in the vertical direction of the motion vector are used. This value is represented as a motion control signal component z.

The motion control signal for the left-right inclination of the surface of the road is one of the motion control signal components "roll". As is clear from FIG. 5, the rotation component $v_{roti}$ can be represented by a value such that 25 motion vectors are added together. The motion control signal for the centrifugal force in a curve is one of the motion control signal components "roll" and is represented by a horizontal component u. The motion control signal for the inertial force by acceleration and deceleration is one of the motion control signal components "pitch" and is represented by low-frequencies of the differentiated value of the magnification component $v_{zoom}$. The reason the motion control signal is a low-frequency component is that a sensitive operation is unnecessary for acceleration and deceleration. The motion control signal for the yawing of the automobile in a curve is one of the motion control signal components "yaw" and is represented by a horizontal component u. The reason the motion control signal is -u is that the motion control signal acts in reverse to the centrifugal force in a curve.

| Component to be represented | Motion control signal component | Relationship with 4 components |
|---|---|---|
| Actual stimulus | | |
| Forward-rearward inclination of surface of road | pitch | Low-frequency component of Σv |
| Vibrations received from surface of road | z | High-frequency component of −Σv |
| Left-right inclination of surface of road | roll | −Σv$_{rot}$ |
| Simulated stimulus | | |
| Centrifugal force in curve | roll | u |
| Inertial force due to acceleration and deceleration | pitch | Low-frequency components of dv$_{zoom}$/dt |
| Automobile yawing in curve | yaw | −u |

Figure 6:
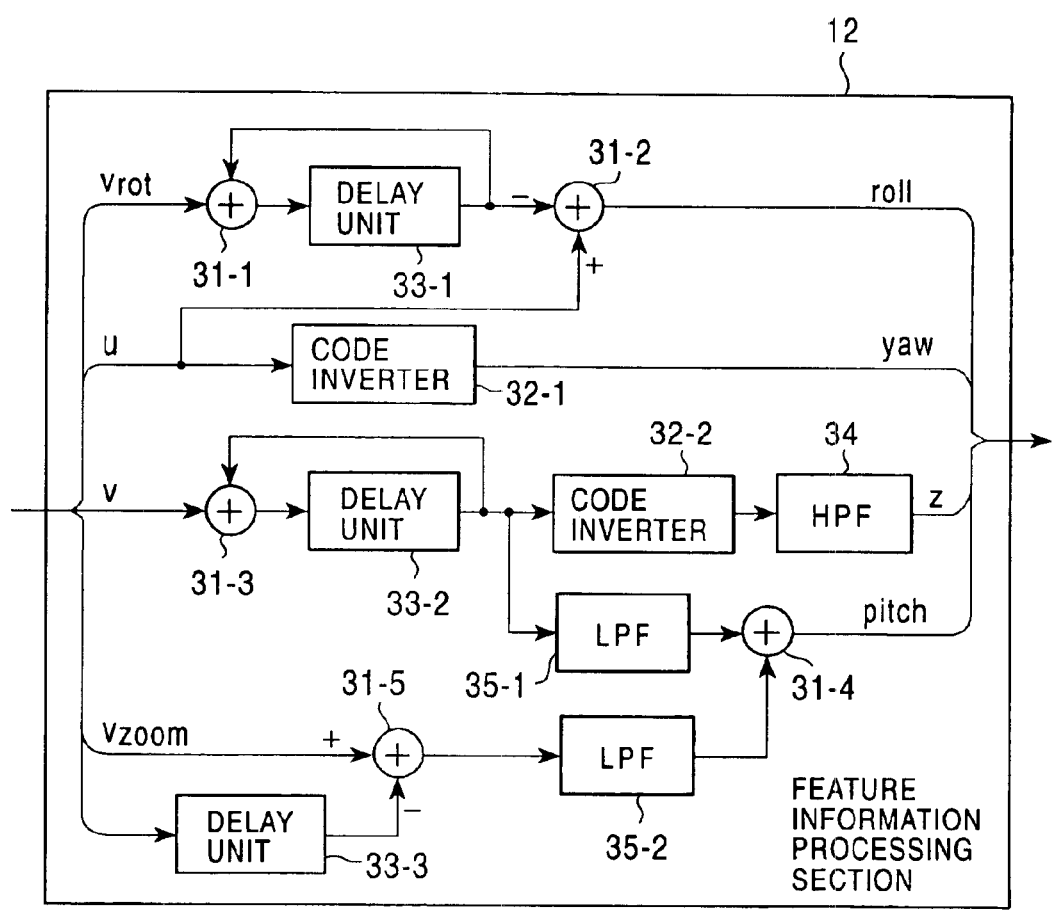
FIG. 6 is a block diagram showing the construction of a feature information processing section 12 of FIG. 1.

The feature information processing section 12 generates a motion control signal to be supplied to the driving section 3 (FIG. 1) by using the above-described relationships. FIG. 6 is a block diagram showing the construction of the feature information processing section 12. Among the four components output from the feature information detection section 11, the rotation component $V_{rot}$ is input to an adder 31-1, the horizontal component u is input to an adder 31-2 and a code inverter 32-1, the vertical component v is input to an adder 31-3, and the magnification component $v_{zoom}$ is input to an adder 31-5 and a delay unit 33-3. The data output from the adder 31-1 is delayed by an amount corresponding to one clock by the delay unit 33-1, after which it is fed back and is input to the adder 31-1. In a similar manner, the data which is output from the adder 31-3 is delayed by an amount corresponding to one clock by a delay unit 33-2, after which it is fed back and is input to the adder 31-3 as well.

The data output from the delay unit 33-1 is input to the adder 31-2, and the data output from the delay unit 33-2 is output to an HPF (High-Pass Filter) 34 via a code inverter 32-2 and is also output to an adder 31-4 via an LPF (Low-Pass Filter) 35-1. The magnification component $v_{zoom}$ which is delayed by an amount corresponding to one clock by the delay unit 33-3 is subtracted from the magnification component $v_{zoom}$ input to an adder 31-5, and the resulting component is input to an adder 31-4 via an LPF 35-2.

Next, a description is given of the computation of the motion control signal components "roll", "yaw", "z", and "pitch", performed by the feature information processing section 12. The rotation component $v_{rot}$ input to the feature information processing section 12 is input to the adder 31-1. The adder 31-1 adds together the rotation component $V_{rot}$ which is input at time t and the data which is output one frame before at time t-1 from the delay unit 33-1. The adder 31-1 computes the motion control signal component "roll" ($\Sigma v_{rot}$) which represents the left-right inclination of the surface of the road by accumulating (integrating) the rotation component $v_{rot}$ in this manner. However, since the motion control signal component "roll" representing the left-right inclination of the surface of the road is $-\Sigma v_{rot}$, the adder 31-2 uses, for computation, data such that the code of the data input from the delay unit 33-1 is inverted.

The motion control signal component "roll" (horizontal component u) is also used to represent the centrifugal force in a curve. Accordingly, the adder 31-2 computes the motion control signal component "roll" to be supplied to the driving section 3 by adding together (subtracting the output of the delay unit 33-1 from the horizontal component u) the data such that the code of the data input from the delay unit 33-1 is inverted and the horizontal component u.

Since the motion control signal component "yaw" of the yawing of the automobile in a curve is obtained by inverting the value of the horizontal component u, the feature information processing section 12 computes the motion control signal component "yaw" by causing the code inverter 32-1 to invert the code of the value of the input horizontal component u.

The adder 31-3 adds together the vertical component v which is input at time t and the vertical component v which is output one frame before at time t-1 from the delay unit 33-2. In this manner, the vertical component v is accumulated (integrated) by the adder 31-3. Then, the data which is accumulated by the adder 31-3 and the delay unit 33-2 is input to the code inverter 32-2 whereby the code is inverted, and further, only the high-frequency components are extracted by the HPF 34. In this manner, the motion control signal component z representing the vibrations received from the surface of the road is computed.

Furthermore, the data output from the delay unit 33-2 is also output to the LPF 35-1 whereby the low-frequency components are extracted. In this manner, the motion control signal component "pitch" representing the forward-rearward inclination of the surface of the road is computed. The motion control signal component "pitch" is also used as a motion control signal component representing the inertial force by acceleration and deceleration. For this reason, the motion control signal component "pitch" output from the LPF 35-1 is added to the motion control signal component "pitch" representing the inertial force by the adder 31-4.

The motion control signal component "pitch" representing the inertial force is computed from the magnification component $v_{zoom}$ input to the feature information processing section 12. The magnification component $v_{zoom}$ input to the feature information processing section 12 is input to the adder 31-5 and the delay unit 33-3. A magnification component $v_{zoom}t$ which is input at time t and a magnification component $v_{zoom}t-1$ which is input at time t-1, delayed by one frame by the delay unit 33-3, are input to the adder 31-5. The adder 31-5 differentiates the magnification component $v_{zoom}$ by subtracting the magnification component $v_{zoom}t-1$ at time t-1 from the magnification component $v_{zoom}t$ input at time t. Then, the LPF 35-2 extracts the low-frequency components from the value output from the adder 31-5, thereby computing the motion control signal component "pitch" representing the inertial force by acceleration and deceleration.

The adder 31-4 adds together the value output from the LPF 35-1 and the value output from the LPF 35-2, thereby computing the motion control signal component "pitch" to be supplied to the driving section 3.

Figure 7:
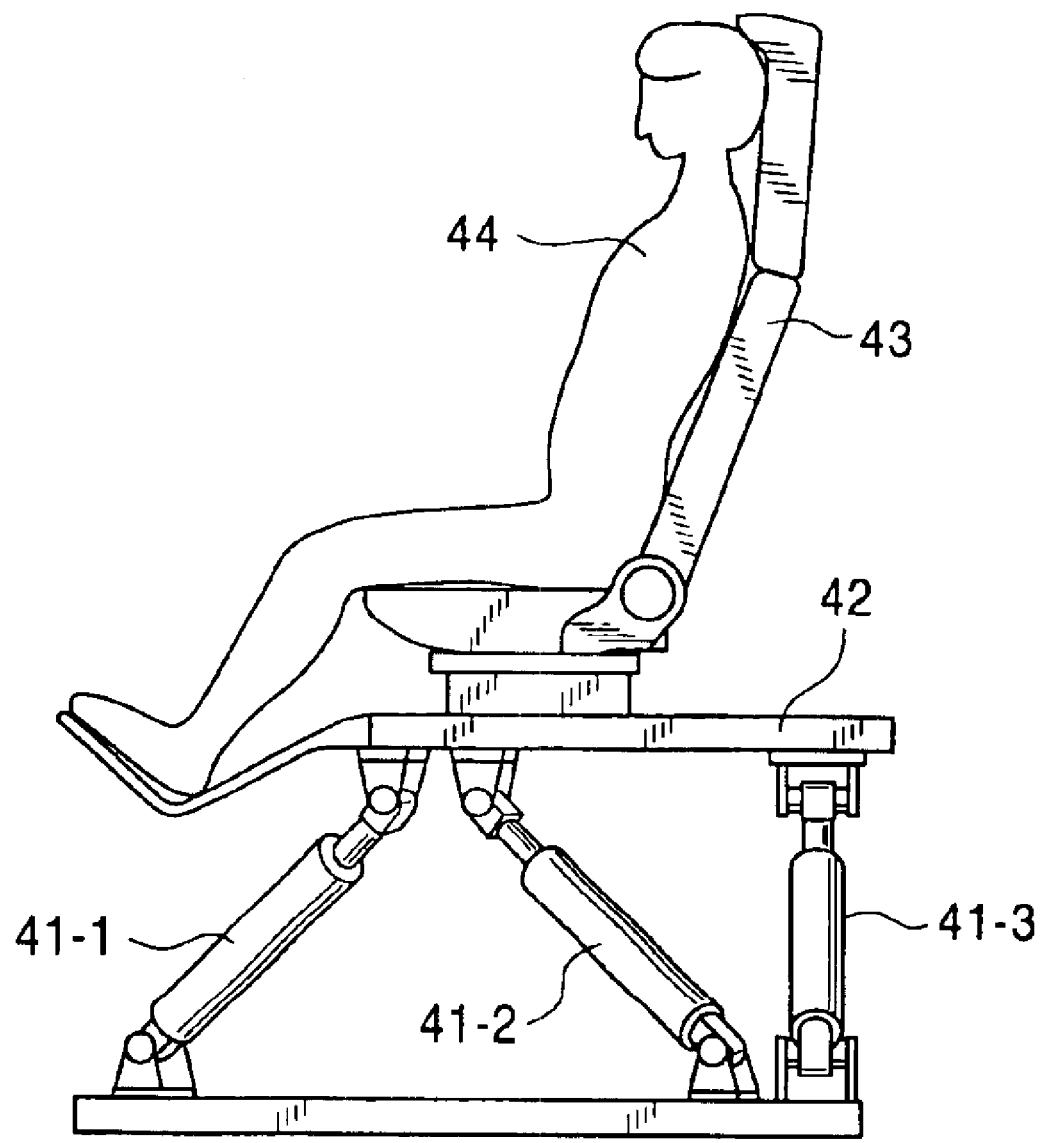
FIG. 7 is a side view of a driving section 3.
Figure 8:
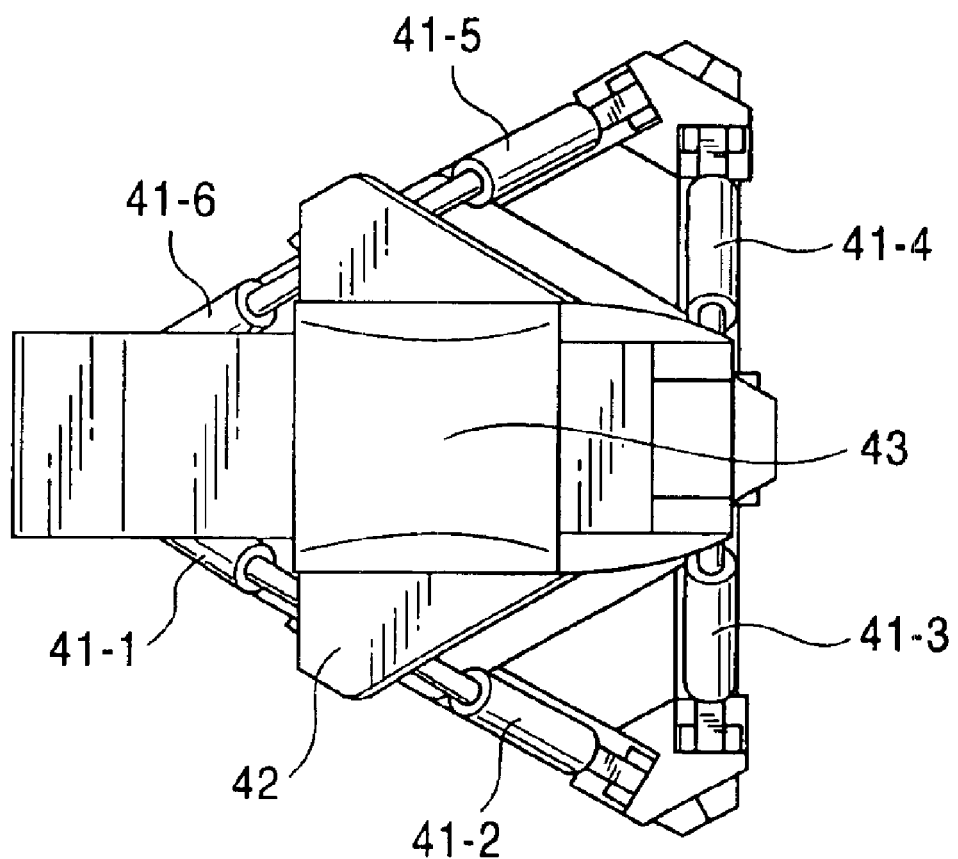
FIG. 8 is a view when the driving section 3 is seen from above.

An example of the driving section 3 is shown in FIGS. 7 and 8. FIG. 7 is a side view of the driving section 3. FIG. 8 is a view when the driving section 3 is seen from above. The driving section 3 comprises six pistons 41-1 to 41-6 serving as actuators, with a base 42 being supported by these pistons. The base 42 has a chair 43 fixed thereto so that an observer 44 may sit on this chair 43.

The pistons 41-1 to 41-6 are capable of extending and retracting along their central axes. As a result of the extending and retracting motion by the pistons 41-1 to 41-6, the base 42 jerks, and furthermore, the chair 43 fixed to the base 42 jerks. A signal for controlling the pistons 41-1 to 41-6 is generated and supplied by the feature information processing section 12 in a manner as described above.

Table 1 shows a specific example of the operation by the driving section 3. The upward arrow in this Table 1 indicates that the piston extends, and the downward arrow indicates that the piston retracts.

TABLE 1

| | | Actual stimulus | | | | | |
|---|---|---|---|---|---|---|---|
| Component to be represented | Motion control signal component | 41-1 | 41-2 | 41-3 | 41-6 | 41-5 | 41-4 |
| Forward-rearward inclination of surface of road | Pitch | Fwd ↓ Rwd ↑ | Fwd ↓ Rwd ↑ | Fwd ↑ Rwd ↓ | Fwd ↓ Rwd ↑ | Fwd ↓ Rwd ↑ | Fwd ↑ Rwd ↓ |
| Vibration received from surface of road | z | ↑↓ | ↑↓ | ↑↓ | ↑↓ | ↑↓ | ↑↓ |
| Left-right inclination of surface of road | roll | Left ↓ Right ↑ | Left ↓ Right ↑ | Left ↓ Right ↑ | Left ↑ Right ↓ | Left ↑ Right ↓ | Left ↑ Right ↓ |

Fwd (Forward): down slope
Rwd (Rearward): up slope
↑ ↓: periodically repeats
Right: portion on right side along travelling direction is low
Left: portion on left side along travelling direction is low

| | | Simulated stimulus | | | | | |
|---|---|---|---|---|---|---|---|
| Component to be represented | Motion Control Signal Compoenent | 41-1 | 41-2 | 41-3 | 41-6 | 41-5 | 41-4 |
| Centrifugal force in curve | roll | Left ↑ Right ↓ | Left ↑ Right ↓ | Left ↑ Right ↓ | Left ↓ Right ↑ | Left ↓ Right ↑ | Left ↓ Right ↑ |
| Inertial force due to acceleration and deceleration | pitch | Dclt ↓ Aclt ↑ | Dclt ↓ Aclt ↑ | Dclt ↑ Aclt ↓ | Dclt ↓ Aclt ↑ | Dclt ↓ Aclt ↑ | Dclt ↑ Aclt ↓ |
| Yawing of automobile in curve | yaw | Left ↑ Right ↓ | Left ↓ Right ↑ | Left ↑ Right ↓ | Left ↓ Right ↑ | Left ↑ Right ↓ | Left ↓ Right ↑ |

Left: automobile turns left
Right: automobile turns right
Dclt: decelerates
Aclt: accelerate As described above, in this embodiment, the motion control signal component is computed from the motion obtained from the image. This makes it possible to obviate the need to determine the motion control signal component in order to input it in advance by observing the image by a person. In addition, use of a sensor, etc., makes it possible to easily generate a motion control signal component from the image in which a motion control signal component is not generated.

Although in this embodiment a motion vector is detected, it is also possible to detect only the direction of the motion or only the quantity of the motion, depending on the application.

Although in the above-described example an example by hardware is shown, the operation of the present invention may be provided as a program which is computer-controllable software. This program may be supplied to an information processing apparatus which is controlled by a computer by using an information storage medium, such as a magnetic disk, an optical disk such as a CD-ROM, magnetic tape, etc., or by using a storage medium, such as a transmission medium utilizing a network using the Internet, a digital satellite, etc.

This program may comprise a feature information detecting step, a feature information processing step, and a driving step which perform processing which is the same as the processing performed by the feature information detection section 11, the feature information processing section 12, and the driving section 3, which is a realization example by hardware shown in FIG. 1, and these steps may be performed, for example, for each frame.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit land scope of the invention as hereafter claimed. The scope of the following claims is to be accorded the broadest interpretation so as to encompass all such modifications equivalent structures and functions.

What is claimed is:

1. An information processing apparatus comprising:
   a motion detector for detecting motion vectors for a plurality of predetermined blocks within each frame of an image signal to be displayed by a display device;
   a generator for generating a motion control signal corresponding to each frame of said image signal by calculating said motion vectors; the motion control signal being generated to represent both actual stimulus and simulated stimulus to an object; the simulated stimulus including at least components corresponding to centrifugal force, inertial force, and yaw; and
   a driving device for driving the object in accordance with said motion control signal, whereby the movement of the driven object is controlled by the motion control signal in a manner imparting both actual and simulated stimulus to the object.

2. An information processing apparatus according to claim 1, wherein said motion control signal contains a plurality of components.

3. An information processing method comprising the steps of:
   detecting motion vectors for a plurality of predetermined blocks within each frame of an image signal to be displayed by a display device;
   generating a motion control signal corresponding to each frame of said image signal by calculating said motion vectors; the motion control signal being generated to represent both actual stimulus and simulated stimulus to an object; the simulated stimulus including at least components corresponding to centrifugal force, inertial force, and yaw; and
   driving the object in accordance with said motion control signal, whereby the movement of the driven object is controlled by the motion control signal in a manner imparting both actual and simulated stimulus to the object.

4. An information processing apparatus according to claim 3, wherein said motion control signal contains a plurality of components.

5. A storage medium storing a computer-controllable program, said program comprising the steps of:
   detecting motion vectors for a plurality of predetermined blocks within each frame of an image signal to be displayed by a display device;
   generating a motion control signal corresponding to each frame of said image signal by calculating said motion vectors; the motion control signal being generated to represent both actual stimulus and simulated stimulus to an object; the simulated stimulus including at least components corresponding to centrifugal force, inertial force, and yaw; and
   driving the object in accordance with said motion control signal, whereby the movement of the driven object is controlled by the motion control signal in a manner imparting both actual and simulated stimulus to the object.

6. An information processing method according to claim 5, wherein said motion control signal contains a plurality of components.

* * * * *